(12) United States Patent
Lor et al.

(10) Patent No.: US 9,679,340 B2
(45) Date of Patent: Jun. 13, 2017

(54) MULTI-LOCATION LEARNING-ACTIVITY STATE MANAGEMENT FOR DISTANCE EDUCATION

(71) Applicant: Hong Kong Applied Science and Technology Research Institute Company Limited, Hong Kong (HK)

(72) Inventors: Kar-Wing Edward Lor, Hong Kong (HK); Wing Hei Au, Hong Kong (HK)

(73) Assignee: Hong Kong Applied Science and Technology Reserach Institute Company Limited, Hong Kong (HK)

( * ) Notice: Subject to any disclaimer, the term of this patent is extended or adjusted under 35 U.S.C. 154(b) by 348 days.

(21) Appl. No.: 14/549,554

(22) Filed: Nov. 21, 2014

(65) Prior Publication Data

US 2016/0148329 A1    May 26, 2016

(51) Int. Cl.
*G09B 3/00* (2006.01)
*G06Q 50/20* (2012.01)
*G06Q 10/00* (2012.01)

(52) U.S. Cl.
CPC .............. *G06Q 50/20* (2013.01); *G06Q 10/00* (2013.01)

(58) Field of Classification Search
CPC ..................................................... G06Q 50/20

USPC ......................................................... 434/350
See application file for complete search history.

(56) References Cited

U.S. PATENT DOCUMENTS

2007/0224585 A1* 9/2007 Gerteis .................... G09B 5/00
                                                         434/350
2014/0072945 A1    3/2014 Gu et al.

* cited by examiner

*Primary Examiner* — Kesha Frisby
(74) *Attorney, Agent, or Firm* — Spruson & Ferguson (Hong Kong) Limited

(57) ABSTRACT

A method for delivering distance education for real clients, each either a teacher client or a student client, at multiple teaching sites and a system using the method are provided. A multi-layer arrangement is used to arrange computing servers to be one first-level server and one or more second-level servers each communicable with the first-level server. Each server serves real clients located in a pre-determined site. Furthermore, each server sets up a virtual client to execute the teacher client's activity command so as to locally generate application-specific data, which are then stored in this server. When a communication link to a student client is re-established after an activity interruption, resynchronization of the student client's learning-activity state with the teacher client's is regained based on the locally-generated application-specific data stored in the server that serves the student client without a need to burden other servers.

20 Claims, 5 Drawing Sheets

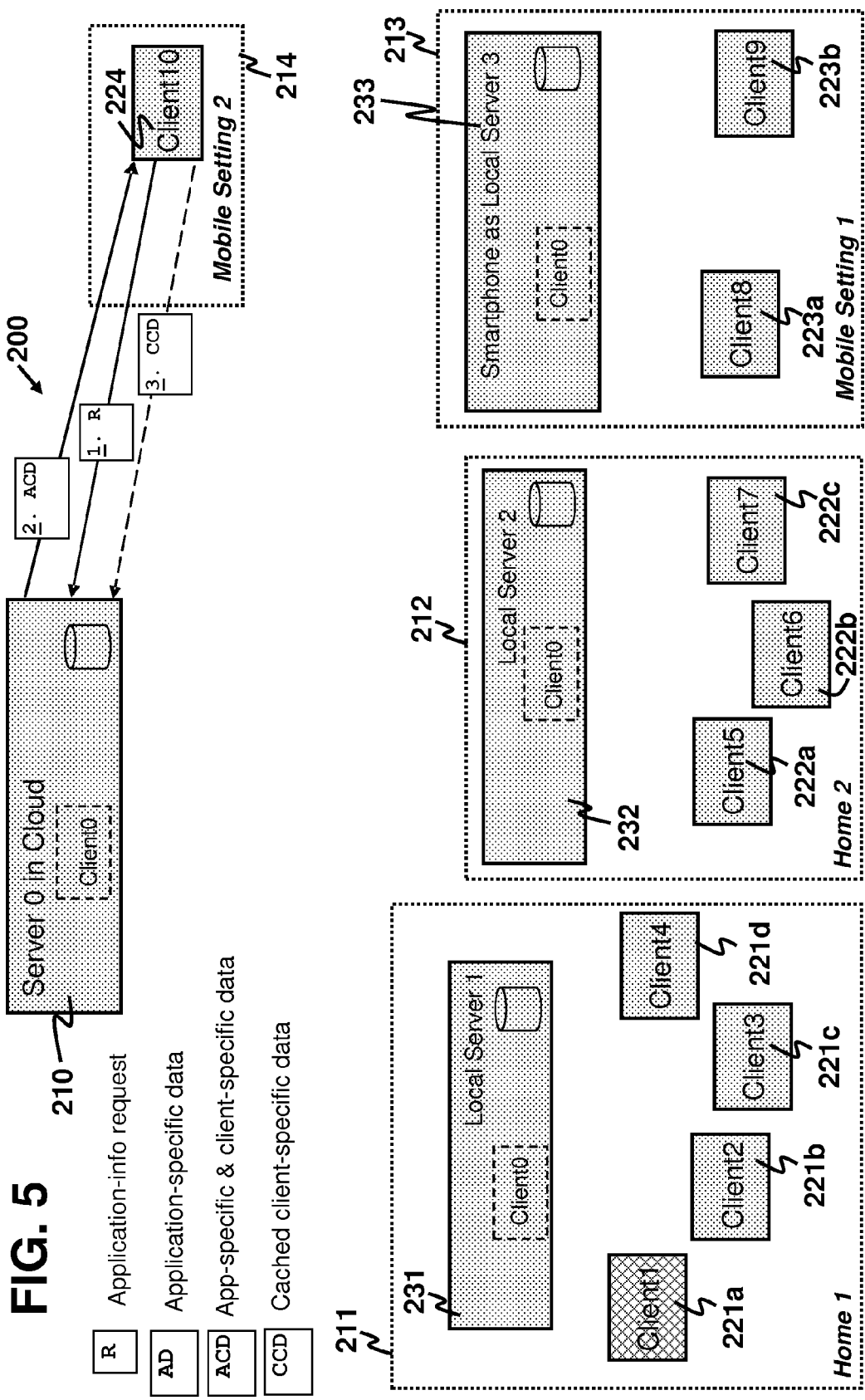

MULTI-LOCATION LEARNING-ACTIVITY STATE MANAGEMENT FOR DISTANCE EDUCATION

FIELD OF THE INVENTION

The present invention generally relates to a computer-implementable method for delivering distance education that involves a plurality of real clients at multiple teaching sites, and a system using this method. In particular, the present invention relates to such method and system based on a multi-layer arrangement of servers for performing learning-activity state re-synchronization in case of an activity interruption.

BACKGROUND

Distance education, or distance learning, has become more and more popular partly because of the pervasiveness of the Internet so that an increasing number of students who are geographically widely separated are able to real-time interact with a teacher who is located at another place. It is furthermore possible that these students are also widely separated at multiple teaching sites. Having a technique optimized for delivering distance education at multiple teaching sites is desirable.

In the art, a typical technique for providing distance education at multiple teaching sites, such as the one suggested in US20140072945, uses one central server to real-time distribute the teaching materials and the instructions of a teacher to students through a communication network. Since it is desirable to deliver correct teaching materials to the students at the time instant that the teacher issues the corresponding learning-activity instruction, the central server is required to maintain synchronization between the learning-activity state of each student and the teacher's learning-activity state. When a communication link between a particular student and the central server is recovered after a temporary loss of connectivity, the central server is required to restore any learning activity missed by this student. The restoration procedure includes resynchronization of learning-activity state between the teacher and the student. One consequence of having students at multiple teaching sites is that the total number of students is potentially large, causing a lot of resynchronization activities required to be performed by the central server and thus significantly loading the central server.

There is a need in the art to have a technique improved over existing ones for providing distance education at multiple teaching sites.

SUMMARY OF THE INVENTION

An aspect of the present invention is to provide a computer-implementable method for delivering distance education that involves a plurality of real clients at multiple teaching sites, where one of the real clients is a teacher client for issuing an activity command to advance the teacher client's learning-activity state, and the remaining real clients are student clients for executing the activity command that is received.

In the method, plural computing servers are arranged to be one first-level server, and one or more second-level servers each communicable with the first-level server via an individual first communication link. An individual server is configured to serve an individual real client located at a pre-determined teaching site and to communicate with said individual real client via an individual second communication link. The servers are co-configured to perform that the activity command sent from the teacher client to the server that serves the teacher client is relayed to the remaining servers through the first communication links, and to perform that the activity command available at all the servers is relayed to the student clients through the second communication links used by the student clients. The individual server is further configured to set up a virtual client that executes the activity command received by the individual server for locally generating application-specific data, and to store the locally-generated application-specific data in the individual server. When any of the first and the second communication links is re-established after an activity interruption, one or more learning activities missed by any student client that has been affected by the interruption are restored. The restoration includes re-synchronizing the learning-activity state of the affected student client with the teacher client's learning-activity state based on the locally-generated application-specific data stored in the server that serves the affected student client.

An implementable resynchronization procedure is as follows. When the second communication link between any first student client and any first server is re-established after a first period of activity interruption where the first server is either the first-level server or one of the second-level servers, the first server sends a copy of the application-specific data generated during the first interruption period and stored in the first server to the first student client. Synchronization between the first student client's learning-activity state and the teacher client's is regained without a need to burden the servers other than the first server.

Another implementable resynchronization procedure is provided as follows. When the first communication link between any first second-level server and the first-level server is re-established after a second period of activity interruption and when the teacher client is not served by the first second-level server, the first-level server sends a copy of the application-specific data generated during the second interruption period and stored in the first-level server to the first second-level server to update the locally-generated application-specific data stored in the first second-level server. It follows that synchronization between the learning-activity state of the virtual client of the first second-level server and the teacher client's learning-activity state is regained without a need to burden the servers other than the first-level server and the first second-level server. After the synchronization between the learning-activity state of the virtual client of the first second-level server and the teacher client's learning-activity state is regained, the first second-level server sends the updated application-specific data stored in the first second-level server to each student client that the first second-level server serves so as to re-synchronize the aforesaid each student client's learning state with the teacher client's.

Other aspects of the present invention are disclosed as illustrated by the embodiments hereinafter.

BRIEF DESCRIPTION OF THE DRAWINGS

FIG. 5 depicts, in accordance with one embodiment of the present invention, restoring one or more learning activities missed by a student client, including resynchronization, when a communication link between a cloud-based server (a first-level server) and the student client is re-established after an activity interruption.

DETAILED DESCRIPTION

Figure 1:
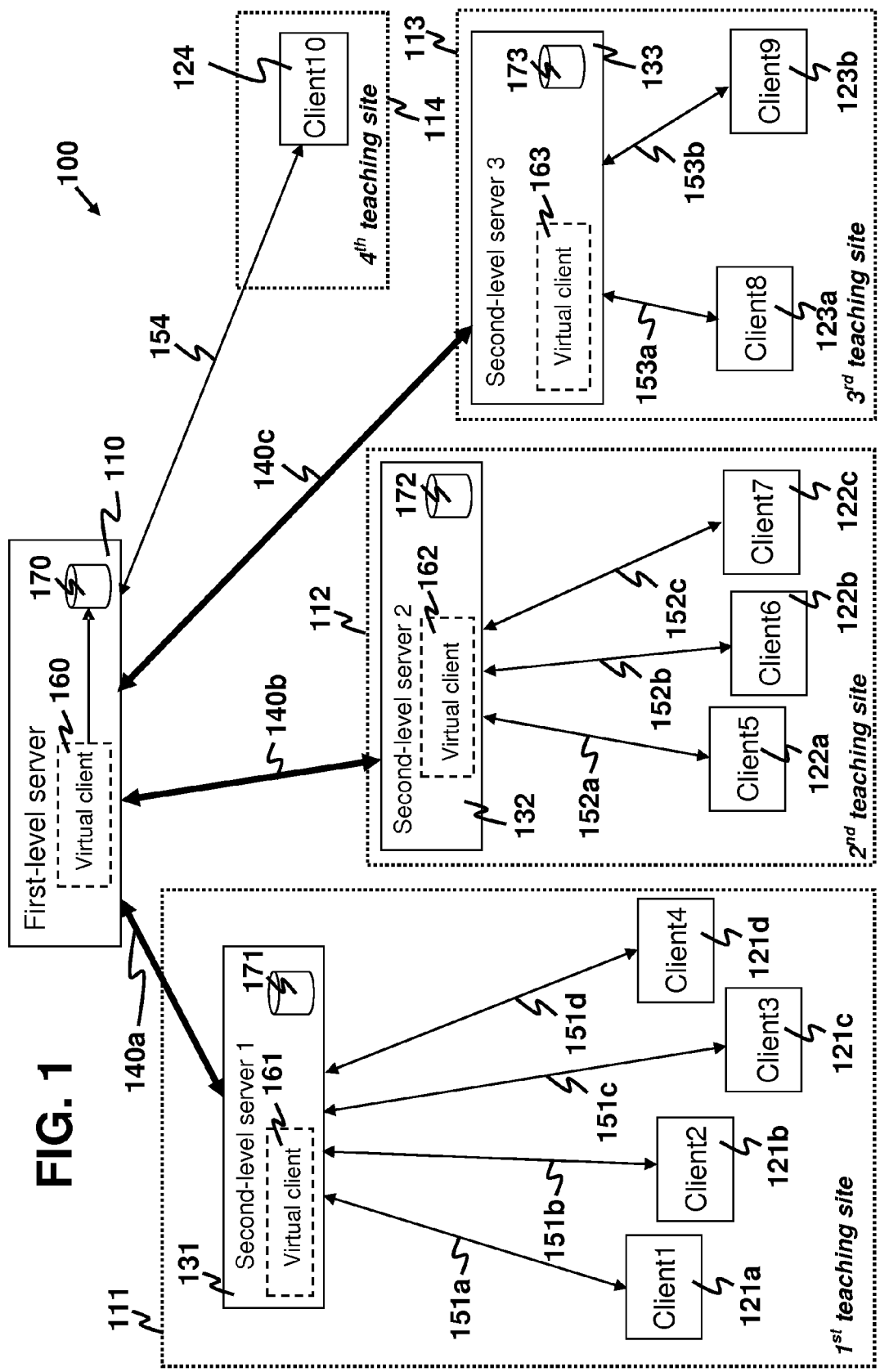
FIG. 1 depicts, according to an exemplary embodiment of the present invention, a multi-layer arrangement of servers for delivering distance education over multiple teaching sites.

The following definitions are used herein in the specification and the appended claims. "A cloud" is construed and interpreted in the sense of cloud computing or, synonymously, distributed computing over a network unless otherwise specified. "A server" is interpreted in the sense of computing. The one or more storages may be, for example, hard disks or solid-state disk drives. A server is generally equipped with one or more processors for executing program instructions, and one or more storages for storing data. A server may be a standalone computing server, or a distributed server in the cloud. "A client" is a computing device or a piece of software that accesses a computing server for a service, where the computing device has computing power and generally comprises one or more processors for executing program instructions, and one or more storages for storing data. The client can be a real client or a virtual client. "A real client" means a physical computing device such as a desktop computer, a smartphone or a handheld tablet computer. "A virtual client" is a piece of software mimicking a real client in accessing the service provided by any server. As one practical example, the virtual client may be set up or created in a server by programming the server. "A teacher client" is a real client that is used by a teacher. The teacher is a controller in distance education, and uses the teacher client to issue one or more learning-activity commands so as to control and advance a learning-activity state in the distance education. "A student client" is a real client used by a student. The student client is configured to execute the one or more learning-activity commands that are received so that the student receives teaching from the teacher. "A learning-activity command," or "an activity command," is an instruction issued by the teacher to each student. An example of the learning-activity command is: when the teacher turns to page 4 of the slides, the command instructs all the student clients to display page 4. "Application-specific data" are data related to one or more states when running an application in a client. As an example, the application-specific data include elements such as an application identifier, an execution state, one or more sequences of execution data, etc. "Client-specific data" are data that are specific to a particular client. That is, the client-specific data of one client are different from those of another client. Examples of the client-specific data include a student client's answer to a question, and any input made by the student client.

An aspect of the present invention is to provide a computer-implementable method for delivering distance education that involves a plurality of real clients at multiple teaching sites. One of the real clients is a teacher client for issuing an activity command to advance the teacher client's learning-activity state. The remaining real clients are student clients for executing the activity command that is received.

In particular, the present invention addresses resynchronization of the teacher client's learning-activity state and the learning-activity state of a student client affected by a learning-activity interruption. As used herein, "a learning-activity interruption" or "an activity interruption" in an interruption to a student's learning in the sense that the student has a student client whose learning-activity state is not synchronized with and lags behind a teacher client's learning-activity state. The activity interruption is manifested in a loss of connectivity between the teacher client and the affected student client. There are many different causes of the activity interruption. For example, the activity interruption may be caused by a failure of a communication link (wired or wireless) between the student client and a server that provides distance education, by a failure of communication link between any two servers in a system that provides distance education, or by a crash of hardware or software of the student client. Note that the crash of hardware or software of the student client typically leads to a loss of communication connectivity between the student client and a server connected thereto. Resynchronization is achievable only after the communication connectivity is re-established.

To deal with the presence of multiple teaching sites, the method disclosed herein is based on using a plurality of computing servers arranged with a multi-layer arrangement. In particular, the computing servers are arranged as one first-level server and one or more second-level servers. Each second-level server is communicable with the first-level server via an individual first communication link. An individual server, which is either the first-level server or any one of the second-level servers, is configured to serve an individual real client located at a pre-determined teaching site and to communicate with the aforesaid individual real client via an individual second communication link. In addition, the servers are co-configured, by programming the servers, to perform the following two tasks. First, the activity command sent from the teacher client to the server that serves the teacher client is relayed to the remaining servers through the first communication links. Second, the activity command available at all the servers is relayed to the student clients through the second communication links used by the student clients. The two tasks are achievable when all of the first and the second communication links are in a good condition and none of these communication links fails.

The method is illustrated with an aid of FIG. 1, which exemplarily depicts a system for delivering distance education using the disclosed method. A system 100 is configured to deliver distance education over four teaching sites 111, 112, 113, 114. Although four teaching sites are used in FIG. 1 for illustration, the method disclosed herein is applicable to any non-zero number of teaching sites. The system 100 comprises one first-level server 110 and three second-level servers 131, 132, 133. The first-level server 110 is connected to the first, the second and the third second-level servers 131, 132, 133 via first communication links 140a, 140b, 140c, respectively. The first second-level server 131 serves real clients 121a-121d located in the first teaching site 111. The real clients 121a-121d are connected to the first second-level server 131 through second communication links 151a-151d, respectively. The second second-level server 132 serves real clients 122a-122c located in the second teaching site 112, where the real clients 122a-122c communicate with the second second-level server 132 via second communication links 152a-152c, respectively. The third second-level server 133 serves real clients 123a, 123b located in the third teaching site 113. The real clients 123a, 123b communicate with the third second-level server 133 through second communication links 153a, 153b, respectively. The fourth teaching site 114 has a real client 124 directly connected to the first-level server 110 via one second communication link 154.

In addition, an individual server, which is either the first-level server or any one of the second-level servers, is configured to set up a virtual client that executes the activity command received by the individual server to locally generate application-specific data. The virtual client runs the identical activity command as run by any student client in order to keep track of application states. As mentioned above, the application-specific data are data related to the application states, which are indicative to the current learning-activity state. The individual server is further configured to store the locally-generated application-specific data in the individual server. The stored application-specific data is usable for possible future restoration of any learning activity missed by a student client affected an activity interruption. As is shown in FIG. 1, the servers 110, 131, 132, 133 respectively include virtual clients 160, 161, 162, 163 for generating copies of the application-specific data, and storages 170, 171, 172, 173 for storing these copies.

When any of the first and the second communication links is re-established after an activity interruption, one or more learning activities missed by any student client that has been affected by the activity interruption are restored. This restoration includes re-synchronizing the learning-activity state of the affected student client with the teacher client's learning-activity state based on the locally-generated application-specific data stored in the server that serves the affected student client.

How the affected student client processes the application-specific data to achieve resynchronization depends on how the affected student client is programmed or configured. In one configuration, the affected student client overwrites the originally-stored application-specific data with the received one so that the affected student client directly catches up the last one of the missed learning activities and skips the intermediate ones. In another configuration, the affected student client speeds up execution of the application (e.g., viewing the teaching material) in order that the originally-stored application-specific data can be evolved into the received one in a shorter time due to speedier execution. This configuration enables the student, who uses the affected student client, to go through all of the missed learning activities.

Two implementable resynchronization procedures, which depend on whether the first or the second communication link is involved, are given as follows.

When the second communication link (e.g. 151a-151d, 152a-152c, 153a, 153b, 154) between any student client and any server, which is either the first-level server 110 or one of the second-level servers 131, 132, 133, is re-established after a time period of activity interruption, a copy of the application-specific data generated during the interruption period and stored in the aforesaid server is sent to the student client such that synchronization between the student client's learning-activity state and the teacher client's is regained without a need to burden the servers other than the aforesaid server.

When the first communication link (e.g. 140a-140c) between any second-level server (e.g., 131, 132, 133) and the first-level server 110 is recovered after a time period of activity interruption, and when the teacher client is not served by the aforesaid second-level server, a copy of the application-specific data generated during the interruption period and stored in the first-level server 110 is sent to the second-level server to update the locally-generated application-specific data stored therein. As a result, synchronization between the learning-activity state of the virtual client of the aforesaid second-level server and the teacher client's learning-activity state is regained without a need to burden the servers other than the first-level server 110 and the aforesaid second-level server. After the synchronization is regained, the updated application-specific data stored in the second-level server is sent to each student client that the second-level server serves so as to re-synchronize this student client's learning state with the teacher client's.

The method may further include one or more of the following preferable options.

In one option, each of the second-level servers 131, 132, 133 forwards the locally-generated application-specific data thereof to the first-level server 110 for storing therein as a back-up. Storing the application-specific data generated by different servers is preferable when it is expected that different servers generate non-identical sets of such data. This situation arises, for example, when the activity command issued by the teacher is directed to student clients only located at some, but not all, of the teaching sites.

In another option, client-specific data generated by each student client served by the first-level server 110 (e.g., Client10 124 of the fourth teaching site 114) are sent to the first-level server 110 for storing therein as a back-up. Similarly, for each student client served by one second-level server (e.g., the first second-level server 131 if the student client is Client4 121d of the first teaching site 111), the client-specific data of this student client is stored in both the first-level server 110 and the second-level server that serves this student client. An example of realization of this option is as follows. Client4 121d of the first teaching site 111 forwards the client-specific data thereof to the first second-level server 131 via the second communication link 151d. The client-specific data of Client4 121d is stored in the storage 171. The first second-level server 131 then relays such client-specific data to the first-level server 110 through the first communication link 140a, and the first-level server 110 stores the received client-specific data in the storage 170. Client10 124 of the fourth teaching site 114 forwards the client-specific data thereof to the first-level server 110, which then stores the received client-specific data in the storage 170.

Storing the client-specific data of a student client in the first-level server 110 and possibly the second-level server connected to this student client is advantageous and desirable. For instance, if a student using this student client is suddenly broken down and it is required to use a replacement client device, the previously-stored client-specific data can be loaded from one server into the replacement client device so that the student can resume learning at the point of interruption.

Figure 2:
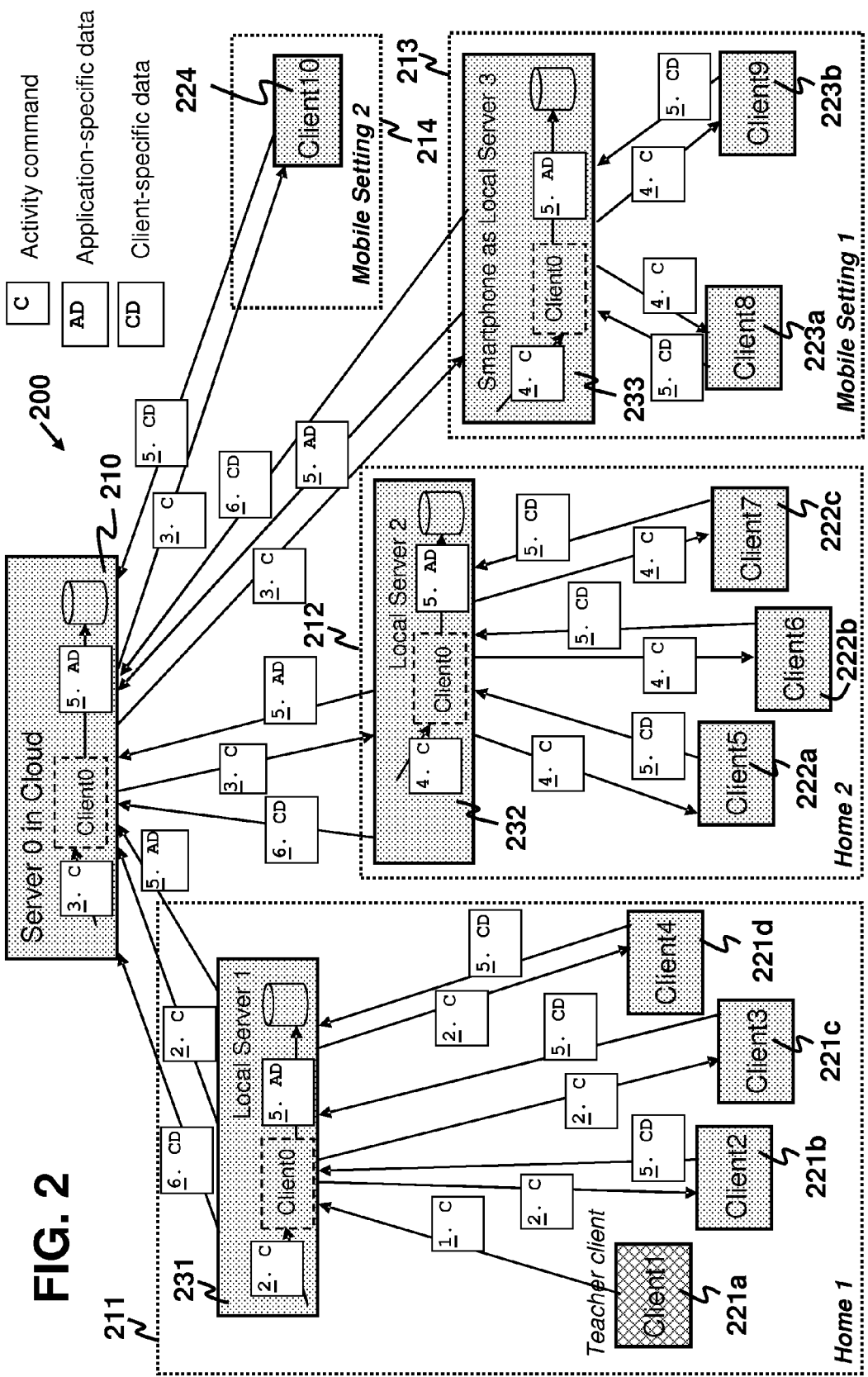
FIG. 2 depicts, as an example, sequences of operation in delivering distance education from a teacher client to plural student clients.

FIG. 2 depicts, in accordance with the disclosed method, an embodiment of operating a distance-education system under a normal operation condition, i.e. when all the communication links do not fail and the teacher client is connected to all the student clients. A system 200 comprises a cloud-based Server0 210 as a first-level server, and Local Servers 231, 232, 233 as second-level servers. Each of these servers 210, 231-233 has a virtual client labeled as Client0. Local Server1 231 serves real clients 221a-221d in a first teaching site 211, which is a home environment labeled as Home 1. Local Server2 232 serves real clients 222a-222c in a second teaching site 212, which is Home2, another home environment. Local Server3 233, which is realized by a smartphone, serves real clients 223a, 223b located in a third teaching site 213 that is a mobile teaching site. Server0 210 serves a real client 224 in a fourth teaching site 214, which is another mobile teaching site. The real client 221a is a teacher client. All other clients are student clients.

In FIG. 2: the numbers 1, 2, 3, 4, 5 and 6 represent orders of performing operations but there is no implication that operations under the same number are performed concurrently and at the same time; the words "C", "AD" and "CD" are data messages standing for "activity command," "application-specific data" and "client-specific data," respectively; and an arrow indicates a data message's flow. The system 200 is operated as follows.

1: The teacher client 221a issues an activity command to Local Server1 231.
2: Local Server1 231 forwards the activity command to the student clients 221b-221d who are located in the first teaching site 211, and to Server0 210. Also, Local Server1 231 executes the activity command by Client0 therein.
3: Local Server0 210 forwards the activity command to Local Server2 212 and Local Server3 233, and also to the student client 224 in the fourth teaching site 214. Local Server0 210 also executes the activity command by Client0 thereof.
4: Local Server2 232 forwards the activity command to the student clients 222a-222c of the second teaching site 212, and executes the activity command by Client0 thereof. Local Server3 233 forwards the activity command to the student clients 223a, 223b of the third teaching site 213, and executes the activity command by Client0 thereof.
5: Each of the servers 210, 231-233 stores a copy of locally-generated application-specific data in the server's storage. Each student client (221b-221d, 222a-222c, 223a, 223b, 224) sends its generated client-specific data to its respective sever (231, 232, 233, 210) for storing therein. Note that the client-specific data of the student client 224 is stored in Server0 210.
6: The three local servers 231-233 send the client-specific data that are received to Server0 210 for storing therein.

Figure 3:
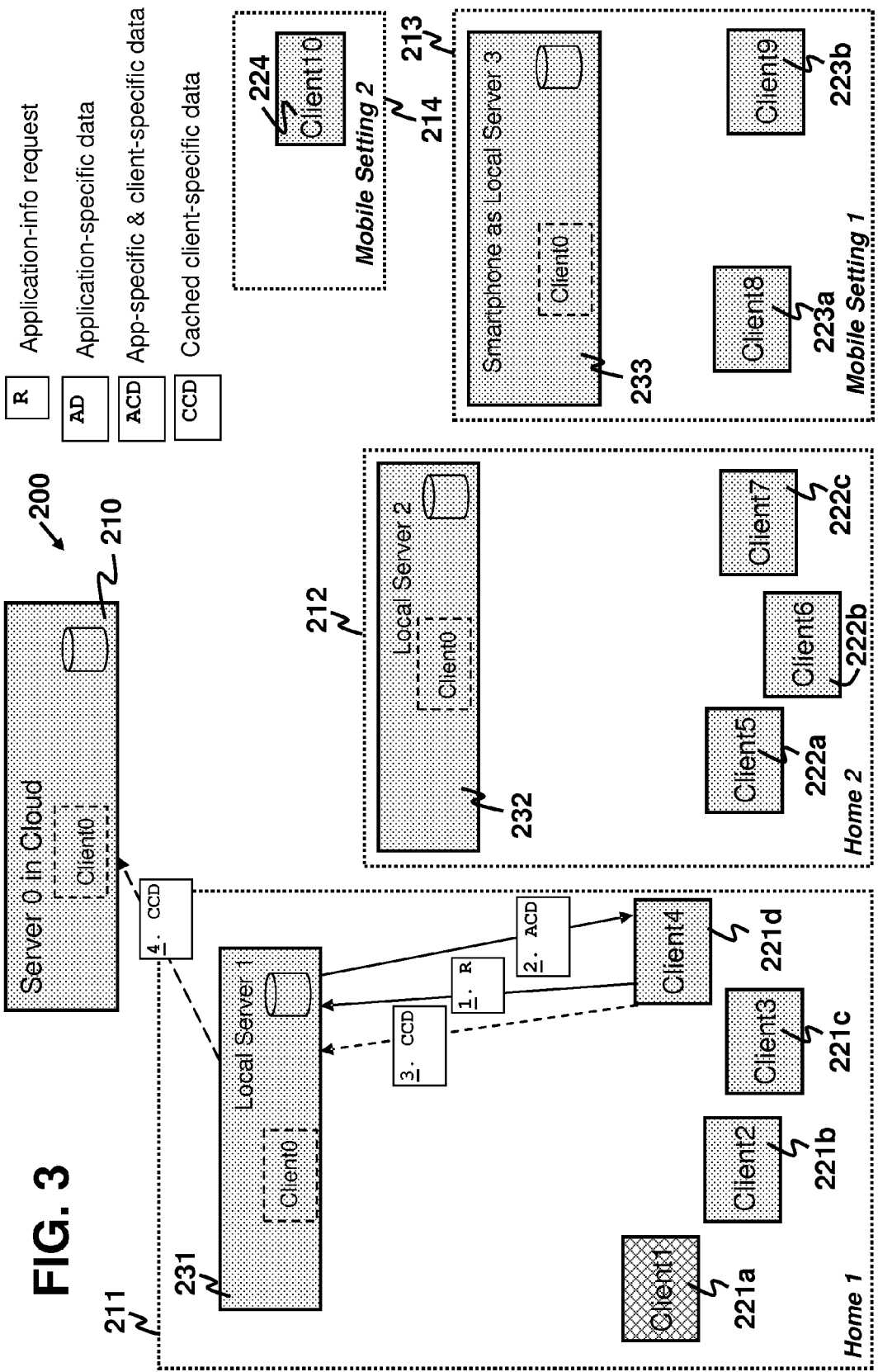
FIG. 3 depicts, in accordance with one embodiment of the present invention, restoring one or more learning activities missed by a student client, including resynchronization of the student client's learning-activity state with the teacher client's, when a communication link between a local server (a second-level server) and the student client is re-established after an activity interruption.
Figure 4:
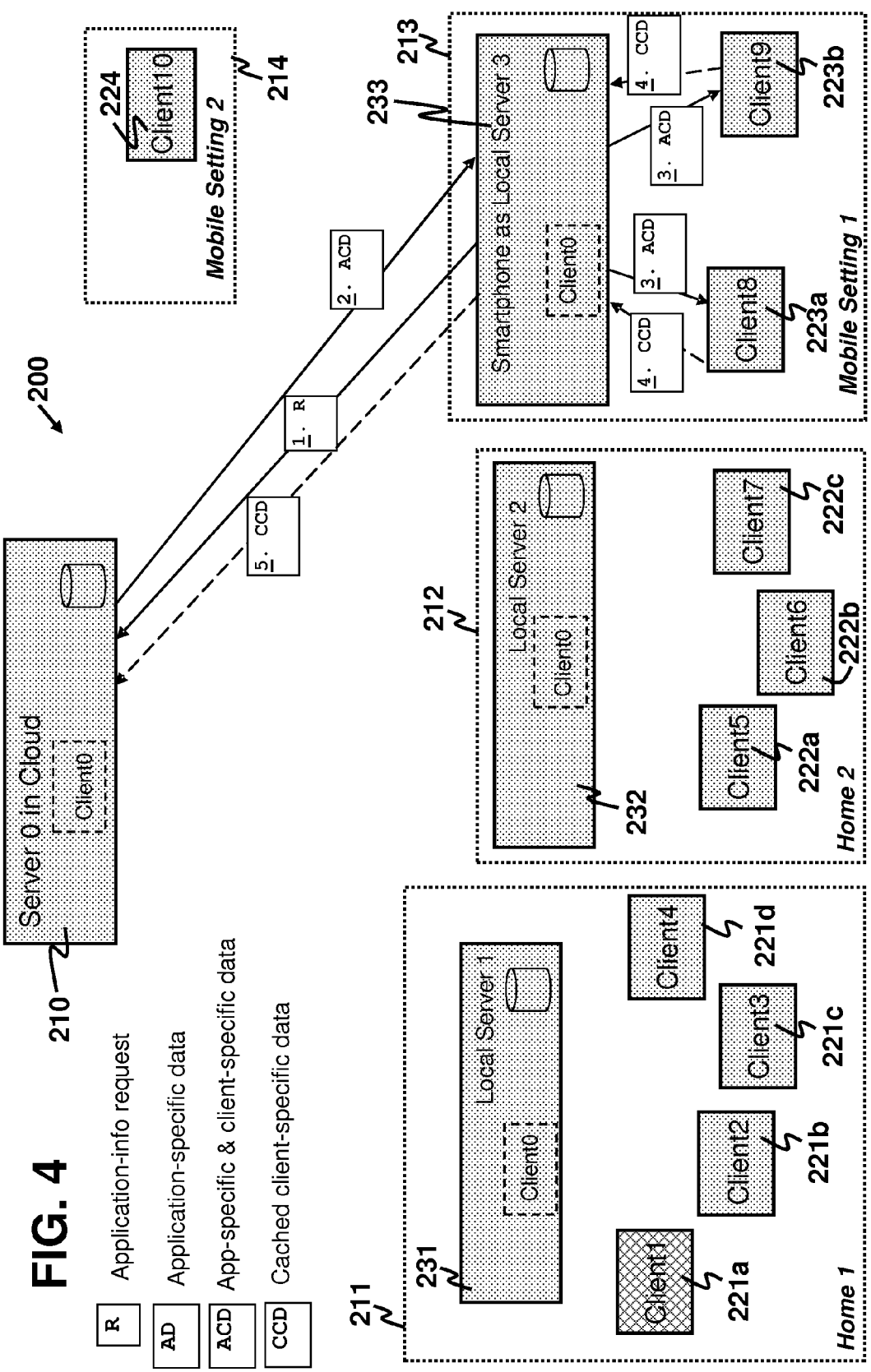
FIG. 4 depicts, in accordance with one embodiment of the present invention, restoring one or more learning activities missed by student clients, including resynchronization, when a communication link between a local server (a second-level server) and a cloud-based server (a first-level server) is re-established after an activity interruption.

FIGS. 3-5 depict, according to some embodiments of the present invention, restoration procedures usable for the system 200, where each of the restoration procedures is used for restoring one or more learning activities missed by a student client, including resynchronization of the student client's learning-activity state with the teacher client 221a's, when a communication link is re-established after an activity interruption. The numbers 1, 2, 3, 4 and 5 represent orders of performing operations but there is no implication that operations under the same number are performed concurrently and at the same time; the words "R", "AD", "ACD" and "CCD" are data messages standing for "application-information request," "application-specific data," "both application- and client-specific data," and "cached client-specific data," respectively; and an arrow indicates a data message's flow.

FIG. 3 depicts the restoration procedure when the second communication link between the student client 221d and the first second-level server 231 is re-established after a time period of activity interruption. The procedure is as follows.

1: The student client 221d sends an application-information request to the first second-level server 231. (The application-information request is for requesting application-specific data generated during the interruption period.)
2: The first second-level server 231 sends to the student client 221d a copy of the application-specific data generated during the interruption period and a copy of the client-specific data previously copied from the student client 221d where both the copies of the application-specific data and of the client-specific data are stored in the first second-level server 231, in order to re-synchronize the student client 221d's learning-activity state and the teacher client 221a's.
3: If there is any client-specific data generated and cached by the student client 221d during the interruption period, the student client 221d sends the cached client-specific data thereof cached to the first second-level server 231 for storing therein. (The cached client-specific data are generated, for instance, if the interruption is due to a loss of communication connectivity between the student client 221d and the first second-level server 231 while a learning activity in the meantime is "standalone," e.g., requiring only a student's input to the student client 221d.)
4: If the first second-level server 231 receives the cached client-specific data from the student client 221d, the first second-level server 231 sends the cached client-specific data to the first-level server 210 for storing therein.

FIG. 4 depicts the restoration procedure when the first communication link between the third second-level server 233 and the first-level server 210 is re-established after a time period of activity interruption. Note that the teacher client 221a is not served by the third second-level server 233. The procedure is as follows.

1: The third second-level server 233 sends an application-information request to the first-level server 210.
2: The first-level server 210 sends to the third second-level server 233 a copy of the application-specific data generated during the interruption period and a copy of the client-specific data previously copied from each client served by the third second-level server 233 where both the copies of the application-specific data and of the client-specific data are stored in the first-level server 210. As a result, synchronization between the learning-activity state of the virtual client of the third second-level server 233 and the teacher client 221a's learning-activity state is regained.
3: The third second-level server 233 relays the aforesaid copy of the application-specific data received from the first-level server 210 to the student clients 223a, 223b served by the third second-level server 233 in order to re-synchronize the teacher client 221a's learning-activity state with the ones of the student clients 223a, 223b. The third second-level server 233 also relays to each of the student clients 223a, 223b the copy of the client-specific data specific to the student client under consideration.
4: Each of the student clients 223a, 223b sends client-specific data thereof, if any, generated and cached during the interruption period to the third second-level server 233 for storing therein; and 5: The third second-level server 233 relays the cached client-specific data received from each of the student clients 223a, 223b, if any, to the first-level server 210 for storing therein.

FIG. 5 depicts the restoration procedure when the second communication link between the student client 224 and the first-level server 210 is re-established after a time period of activity interruption. The procedure is as follows.

1: The student client 224 sends an application-information request to the first-level server 210.

2: The first-level server 210 sends to the student client 224 a copy of the application-specific data generated during the interruption period and a copy of the client-specific data previously copied from the student client 224 where both the copies of the application-specific data and of the client-specific data are stored in the first-level server 210, in order to re-synchronize the teacher client 221a's learning-activity state with the student client 224's.

3: If there is any client-specific data generated and cached by the student client 224 during the interruption period, the student client 224 sends the cached client-specific data thereof to the first-level server 210 for storing therein.

A computer-based system configured to deliver distance education that involves plural real clients at multiple teaching sites is realizable by including a plurality of computing servers co-configured to deliver the distance education according to any one embodiment of the method disclosed above.

Practically, each of the second-level servers is configured to serve the students resided in one teaching site. The number of such students may not be large so that it is possible that one or more of the second-level servers are implementable as learning activity management (LAM) boxes, each of which is an electronic device of small size.

The first-level server may be a physical server connected to the Internet. Alternatively, the first-level server may be a virtual server in a computing cloud. It is possible that at least one of the second-level servers is a smartphone that supports mobile communications, or is configured to support WiFi communications with any real client.

In some implementations, it is preferable that one or more of the servers (first- or second-level) are configured to wirelessly communicate with any real client. It may also be desirable in some implementations that one or more of the second-level servers are configured to communicate with the first-level server via a fixed network.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implementable method for delivering distance education that involves a plurality of real clients at multiple teaching sites, one of the real clients being a teacher client for issuing an activity command to advance the teacher client's learning-activity state, the remaining real clients being student clients for executing the activity command that is received, the method comprising:

arranging a plurality of computing servers to be one first-level server, and one or second-level servers each communicable with the first-level server via an individual first communication link, wherein an individual server is configured to serve an individual real client located at a pre-determined teaching site and to communicate with said individual real client via an individual second communication link, and wherein the servers are co-configured to perform that the activity command sent from the teacher client to the server that serves the teacher client is relayed to the remaining servers through the first communication links, and to perform that the activity command available at all the servers is relayed to the student clients through the second communication links used by the student clients;

configuring the individual server to set up a virtual client that executes the activity command received by the individual server for locally generating application-specific data, and to store the locally-generated application-specific data in the individual server; and when any of the first and the second communication links is re-established after an activity interruption, restoring one or more learning activities missed by any student client that has been affected by the activity interruption, wherein the restoring includes re-synchronizing the learning-activity state of the affected student client with the teacher client's learning-activity state based on the locally-generated, application-specific data stored in the server that serves the affected student client, wherein the re-synchronizing comprises:

when the first communication link between any first second-level server and the el server is re-established after a period of activity interruption and when the teacher client is not served by the first second-level server, sending, by the first-level server, a copy of the application-specific data generated during the interruption period and stored in the first-level server to the first second-level server to update the locally-generated application-specific data stored in the first second-level server such that synchronization between the learning-activity state of the virtual client of the first second-level server and the teacher client's learning-activity state is regained without a need to burden the servers other than the first-level server and the first second-level server; and after the sychronization between the, state of virtual client of the first second-level server and the teacher client's learning-activity state is regained, sending, by the first second-level server, the updated application-specific data stored in the first second-level server to each student client that the first second-level server serves so as to re-synchronize the aforesaid each student client's learning state with the teacher client's.

2. The method of claim 1, wherein the re-synchronizing further comprises:
when the second communication link between any first student client and any first server is re-established after a period of activity interruption where the first server is either the first-level server or one of the second-level servers, sending, by the first server, a copy of the application-specific data generated during the interruption period and stored in the first server to the first student client such that synchronization between the first student client's learning-activity state and the teacher client's is regained without a need to burden the servers other than the first server.

3. The method of claim 1, further comprising:
forwarding, by each second-level server, the locally-generated application-specific data of said each second-level server to the first-level server for storing therein;
if a first student client is served by the first-level server, then forwarding, by the first student client, client-specific data thereof to the first-level server for storing therein; and
if a second student client is served by a first second-level server, then:
(a) forwarding, by the second student client; client-specific data thereof to the first second-level server for storing therein; and
(b) relaying, by the first second-level server, the client-specific data of the second student client to the first-level server for storing therein.

4. The method of claim 3, wherein the restoring comprises, when the second communication link between any first student client and any first second-level server is re-established after a period of activity interruption:
sending, by the first student client, an application-information request to the first second-level server;
sending, by the first second-level server, to the first student client a copy of the application-specific data generated during the interruption period and a copy of the client-specific data previously copied from the first student client where both the copies of the application-specific data and of the client-specific data are stored in the first second-level server, such that synchronization between the first student client's learning-activity state and the teacher client's is regained without a need to burden the servers other than the first second-level server;
if there is any client-specific data generated and cached by the first student client during the interruption period, sending, by the first student client, the cached client-specific data thereof to the first second-level server for storing therein; and
after the first second-level server receives the cached client-specific data from the first student client, sending, by the first second-level server, the cached client-specific data received from the first student client to the first-level server for storing therein.

5. The method of claim 4, wherein the restoring further includes, when the first communication link between any first second-level server and the first-level server is re-established after a period of activity interruption and when the teacher client is not served by the first second-level server:
sending, by the first second-level server, an application-information request to the first-level server;
sending, by the first-level server, to the first second-level server a copy of the application-specific data generated during the interruption period and a copy of the client-specific data previously copied from each client served by the first second-level server where both the copies of the application-specific data and of the client-specific data arc stored in the first-level server, such that synchronization between the learning-activity state of the virtual client of the first second-level server and the teacher client's learning-activity state is regained without a need to burden the servers other than the first-level server and the first second-level server;
relaying, by the first second-level server, the aforesaid copy of the application-specific data received from the first-level server to each student client served by the first second-level server;
relaying, by the first second-level server and to an individual student client served by the first second-level server, the copy of the client-specific data received from the first-level server and specific to the aforesaid individual student client;
if there is any client-specific data generated and cached by said each student client during the interruption period, sending, by said each student client, the cached client-specific data thereof to the first second-level server for storing therein; and
after the first second-level server receives the cached client-specific data from said each student client, relaying, by the first second-level server, the cached client-specific data received from said each student client to the first-level server for storing therein.

6. The method of claim 4, wherein the restoring further includes, when the second communication link between any first student client and the first-level server is re-established after a period of activity interruption:
sending, by the first student client, an application-information request to the first-level server;
sending, by the first-level server, to the first student client a copy of the application-specific data generated during the interruption period and a copy of the client-specific data previously copied from the first student client where both the copies of the application-specific data and of the client-specific data are stored in the first-level server, such that synchronization between the first student client's learning-activity state and the teacher client's is regained without a need to burden the servers other than the first-level server; and
if there is any client-specific data generated and cached by the first student client during the interruption period, sending, by the first student client, the cached client-specific data thereof to the first-level server for storing therein.

7. A system configured to deliver distance education that involves a plurality of real clients at multiple teaching sites, one of the real clients being a teacher client for issuing an activity command to advance the teacher client's learning-activity state, the remaining real clients being student clients for executing the activity command that is received, the system comprising a plurality of computing servers, wherein the servers are co-configured to deliver the distance education according to the method of claim 1.

8. The system of claim 7, wherein the first-level server is a virtual server in a computing cloud.

9. The system of claim 8, wherein at least one of the second-level servers is a smartphone that supports mobile communications.

10. The system of claim 8, wherein at least one of the second-level servers is configured to support WiFi communications with any real client.

11. The system of claim 8, wherein one or more of the servers are configured to wirelessly communicate with any real client.

12. The system of claim 8, wherein one or more of the second-level servers are configured to wirelessly communicate with the first-level server.

13. The system of claim 8, wherein one or more of the second-level servers are configured to communicate with the first-level server via a fixed network.

14. A system configured to deliver distance education that involves a plurality of real clients at multiple teaching sites, one of the real clients being a teacher client for issuing an activity command to advance the teacher client's learning-activity state, the remaining real clients being student clients for executing the activity command that is received, the system comprising a plurality of computing servers, wherein the servers are co-configured to deliver the distance education according to the method of claim 2.

15. The system of claim 14 wherein at least one of the second-level servers is configured to support WiFi communications with any real client.

16. The system of claim 14, wherein one or more of the servers are configured to wirelessly communicate with any real client.

17. A system configured to deliver distance education that involves a plurality of real clients at multiple teaching sites, one of the real clients being a teacher client for issuing an activity command to advance the teacher client's learning-activity state, the remaining real clients being student clients for executing the activity command that is received, the system comprising a plurality of computing servers, wherein the servers are co-configured to deliver the distance education according to the method of claim 4.

18. A system configured to deliver distance education that involves a plurality of real clients at multiple teaching sites, one of the real clients being a teacher client for issuing an activity command to advance the teacher client's learning-activity state, the remaining real clients being student clients for executing the activity command that is received, the system comprising a plurality of computing servers, wherein the servers are co-configured to deliver the distance education according to the method of claim 5.

19. A system configured to deliver distance education that involves a plurality of real clients at multiple teaching sites, one of the real clients being a teacher client for issuing an activity command to advance the teacher client's learning-activity state, the remaining real clients being student clients for executing the activity command that is received, the system comprising a plurality of computing servers, wherein the servers are co-configured to deliver the distance education according to the method of claim 6.

20. A system configured to deliver distance education that involves a plurality of real clients at multiple teaching sites, one of the real clients being a teacher client for issuing an activity command to advance the teacher client's learning-activity state, the remaining real clients being student clients for executing the activity command that is received, the system comprising a plurality of computing servers, wherein the servers are co-configured to deliver the distance education according to the method of claim 7.

* * * * *